US008872809B2

(12) United States Patent
Suyama et al.

(10) Patent No.: US 8,872,809 B2
(45) Date of Patent: Oct. 28, 2014

(54) LIQUID CRYSTAL DISPLAY APPARATUS, DRIVE CIRCUIT THEREFOR, AND DRIVE METHOD THEREFOR

(75) Inventors: Tatsuhiko Suyama, Osaka (JP); Norio Ohmura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 538 days.

(21) Appl. No.: 13/138,737

(22) PCT Filed: Dec. 10, 2009

(86) PCT No.: PCT/JP2009/070644
§ 371 (c)(1), (2), (4) Date: Sep. 23, 2011

(87) PCT Pub. No.: WO2010/113359
PCT Pub. Date: Oct. 7, 2010

(65) Prior Publication Data

US 2012/0062543 A1 Mar. 15, 2012

(30) Foreign Application Priority Data

Apr. 3, 2009 (JP) ................................ 2009-090822

(51) Int. Cl.
*G06F 3/038* (2013.01)
*G09G 5/00* (2006.01)
*G09G 3/36* (2006.01)

(52) U.S. Cl.
CPC ........ *G09G 3/3655* (2013.01); *G09G 2330/021* (2013.01); *G09G 2310/06* (2013.01)
USPC .......................................................... 345/212

(58) Field of Classification Search
USPC .......................................................... 345/212
See application file for complete search history.

(56) References Cited

U.S. PATENT DOCUMENTS

2005/0179633 A1 8/2005 Inada
2006/0132418 A1* 6/2006 Morita ............................ 345/98
2008/0068321 A1* 3/2008 Kim et al. ....................... 345/90

FOREIGN PATENT DOCUMENTS

JP 2005234139 A 9/2005
JP 2008040195 A 2/2008

OTHER PUBLICATIONS

International Search Report.

* cited by examiner

*Primary Examiner* — Quan-Zhen Wang
*Assistant Examiner* — Nelson D Runkle, III
(74) *Attorney, Agent, or Firm* — Harness, Dickey & Pierce, P.L.C.

(57) ABSTRACT

A liquid crystal display apparatus is disclosed, which is capable of suppressing sound emission caused by the AC drive of liquid crystal while suppressing an increase in power consumption. A non-active period during which polarity reversal of a common electrode signal (VCOM) is repeated at predetermined intervals is provided in each horizontal scanning period. During an active period, a common electrode drive circuit provides a common electrode signal (VCOM) indicating either one of potentials LV1 and LV2 to a common electrode, based on a polarity instruction signal (POL). During the non-active period, the common electrode drive circuit provides a common electrode signal (VCOM) whose potential changes between LV3 and LV4 to the common electrode, based on a reversal timing control signal (CTRL). Here, the amplitude of the common electrode signal (VCOM) for the non-active period is made smaller than the amplitude of the common electrode signal (VCOM) for the active period.

6 Claims, 14 Drawing Sheets

Fig.7A GLEN

Fig.7B POL

Fig.7C CTRL(1)

Fig.7D VCOM(1)

Fig.7E CTRL(2)

Fig.7F VCOM(2)

LIQUID CRYSTAL DISPLAY APPARATUS, DRIVE CIRCUIT THEREFOR, AND DRIVE METHOD THEREFOR

TECHNICAL FIELD

The present invention relates to a liquid crystal display apparatus, and more particularly to a technique for preventing sound emission caused by vibration in a small liquid crystal display apparatus which is adopted in mobile phones, etc.

BACKGROUND ART

Conventionally, there is known an active matrix-type liquid crystal display apparatus including TFTs (Thin Film Transistors) as switching elements. This liquid crystal display apparatus includes a liquid crystal panel composed of two insulating glass substrates facing each other. One glass substrate of the liquid crystal panel is provided with gate bus lines (scanning signal lines) and source bus lines (video signal lines) in a grid pattern, and is provided with TFTs near the respective intersections of the gate bus lines and the source bus lines. Each TFT is composed of a gate electrode connected to a gate bus line; a source electrode connected to a source bus line; and a drain electrode. The drain electrode is connected to a corresponding one of pixel electrodes which are arranged on the glass substrate in a matrix form to form an image. The other glass substrate of the liquid crystal panel is provided with an electrode (this electrode is called a "common electrode", "counter electrode", etc., but is hereinafter called a "common electrode") for applying a voltage between the pixel electrodes and the common electrode through a liquid crystal layer. Then, based on a video signal which is received, when a gate electrode of each TFT receives an active scanning signal from a corresponding gate bus line, by a source electrode of the TFT from a corresponding source bus line, a voltage which is the difference between the potential of the video signal and a potential provided to the common electrode is applied to the liquid crystal layer. By this, the liquid crystal is driven and a desired image is displayed on a screen.

Meanwhile, liquid crystal has the property of deteriorating with continuous application of a direct voltage thereto. Hence, in a liquid crystal display apparatus, an alternating voltage is applied to a liquid crystal layer. This will be described with reference to FIGS. 12 and 13. FIG. 12 is a diagram schematically showing a cross section of a liquid crystal panel of an active matrix-type liquid crystal display apparatus. As shown in FIG. 12, the liquid crystal panel is composed of a TFT array substrate 15 and a color filter substrate 16 which face each other with a liquid crystal layer 13 sandwiched therebetween. The TFT array substrate 15 has pixel electrodes 12, etc., formed thereon and the color filter substrate 16 has a common electrode 14, etc., formed thereon. Application of an alternating voltage to the liquid crystal layer 13 is implemented by reversing the polarity of an applied voltage (to the liquid crystal layer 13) in a portion forming each individual pixel (hereinafter, referred to as a "pixel formation portion") every frame period. Specifically, driving of the liquid crystal display apparatus is performed such that the polarity of a voltage between the common electrode and each source electrode is reversed every frame period. Note that one frame period is a period for displaying an image for one screen on a screen.

For a technique for implementing driving of the liquid crystal display apparatus such as that described above, a driving scheme called line reversal driving, for example, is known. FIG. 13 is a signal waveform diagram for a liquid crystal display apparatus which adopts line reversal driving as its driving scheme. In FIG. 13, reference character THk (TH1, TH2, TH3, . . . ) indicates a period for selecting a gate bus line of a kth row (a horizontal scanning period including a horizontal flyback period), and reference character TF indicates one frame period. For a video signal VS, as shown in FIG. 13, its polarity (a positive or negative polarity with reference to a potential indicated by reference character 90) is reversed every horizontal scanning period, and furthermore, its polarity is also reversed every frame period. Likewise, for a common electrode signal VCOM for providing a desired potential to the common electrode 14, too, its polarity (a positive or negative polarity with reference to the potential indicated by reference character 90) is reversed every horizontal scanning period, and furthermore, its polarity is also reversed every frame period. In addition, the video signal VS and the common electrode signal VCOM are shifted in phase by 180 degrees (one horizontal scanning period) from each other. By this, the polarity of a voltage applied to the liquid crystal layer 13 is reversed every horizontal scanning period, whereby alternating driving of the liquid crystal display apparatus is implemented.

Meanwhile, in recent years, a liquid crystal display apparatus such as that described above has been adopted as a main screen of an electronic device such as a mobile phone. As one of such liquid crystal display apparatuses, there is one called a QVGA (Quarter Video Graphics Array) type having a resolution of 320×240. In such a liquid crystal display apparatus, it is pointed out that glass substrates composing a liquid crystal panel vibrate due to alternating driving such as that described above and the vibration is sensed as an annoying sound. To prevent the occurrence of such an annoying sound caused by vibration (hereinafter, referred to as "sound emission"), for example, a damping material is stuck on the liquid crystal panel, thereby attenuating the vibration.

It is known that sound emission occurs when a frequency (hereinafter, referred to as a "common electrode potential reversal frequency") representing how often reversal of the potential of the common electrode 14 occurs (the term "reversal" as used herein refers to a change from a lower potential to a higher potential with reference to a predetermined potential or a change from a higher potential to a lower potential with reference to a predetermined potential) is in a human-audible frequency band. In a QVGA-type liquid crystal display apparatus, the common electrode potential reversal frequency is on the order of 10 kHz which is in the human-audible frequency band, and thus, the above-described sound emission remarkably appears. In view of this, Japanese Patent Application Laid-Open No. 2008-40195 discloses a technique for suppressing sound emission by bringing the common electrode potential reversal frequency out of the human-audible frequency band by reversing a common electrode signal VCOM during a predetermined period of one horizontal scanning period as shown in FIG. 14. Note that, in the following, a period of each horizontal scanning period during which the common electrode signal VCOM is maintained at a constant level is referred to as an "active period" and a period of each horizontal scanning period during which the common electrode signal VCOM is reversed at predetermined intervals is referred to as a "non-active period".

PRIOR ART DOCUMENT

Patent Document

[Patent Document 1] Japanese Patent Application Laid-Open No. 2008-40195

SUMMARY OF THE INVENTION

Problems to be Solved by the Invention

However, according to an electronic device disclosed in the above-described Japanese Patent Application Laid-Open No. 2008-40195, as shown in FIG. 14, the amplitude of the common electrode signal VCOM for the non-active period is the same as that of the common electrode signal VCOM for the active period. Hence, during the non-active period, the potential of the common electrode signal VCOM changes largely in short cycles. As a result, power consumption increases.

An object of the present invention is therefore to provide a liquid crystal display apparatus capable of suppressing sound emission caused by alternating driving of liquid crystal while suppressing an increase in power consumption.

Means for Solving the Problems

A first aspect of the present invention is directed to a liquid crystal display apparatus comprising:

a plurality of video signal lines for transmitting video signals representing an image to be displayed;

a plurality of scanning signal lines intersecting the plurality of video signal lines;

a video signal line drive circuit that applies the video signals to the plurality of video signal lines;

a scanning signal line drive circuit that selectively drives the plurality of scanning signal lines every horizontal scanning period;

a plurality of pixel electrodes arranged in a matrix form at respective intersection portions of the plurality of video signal lines and the plurality of scanning signal lines;

a common electrode arranged to face the plurality of pixel electrodes, so as to apply a voltage between the plurality of pixel electrodes and the common electrode; and a common electrode drive circuit that drives the common electrode and includes a common electrode potential generating unit that generates a first potential, a second potential, a third potential group, and a fourth potential group, the first potential being a low-level side potential to be provided to the common electrode, the second potential being a high-level side potential to be provided to the common electrode, the third potential group including one or more low-level side potentials having a higher level than the first potential, to be provided to the common electrode, and the fourth potential group including one or more high-level side potentials having a lower level than the second potential, to be provided to the common electrode, wherein the common electrode drive circuit:

alternately provides, during a first period of a horizontal scanning period, the first potential and the second potential to the common electrode every horizontal scanning period, the horizontal scanning period including the first period and a second period; and alternately provides, during the second period, the potentials included in the third potential group and the potentials included in the fourth potential group to the common electrode in each horizontal scanning period.

According to a second aspect of the present invention, in the first aspect of the present invention, the liquid crystal display apparatus further comprises a frequency control unit for externally controlling a frequency of a second period potential instruction signal indicating whether a potential to be provided to the common electrode at an arbitrary point in time during the second period of each horizontal scanning period is a low-level side potential or a high-level side potential, wherein during the second period, the common electrode drive circuit provides the potentials included in the third potential group and the potentials included in the fourth potential group to the common electrode, based on the second period potential instruction signal.

According to a third aspect of the present invention, in the first aspect of the present invention, the liquid crystal display apparatus further comprises a third potential selecting unit that selects any of the potentials included in the third potential group, based on first setting information which can be set externally; and a fourth potential selecting unit that selects any of the potentials included in the fourth potential group, based on second setting information which can be set externally, wherein during the second period, the common electrode drive circuit provides the potential selected by the third potential selecting unit and the potential selected by the fourth potential selecting unit to the common electrode.

According to a fourth aspect of the present invention, in the first aspect of the present invention, the liquid crystal display apparatus further comprises a frequency control unit for externally controlling a frequency of a second period potential instruction signal indicating whether a potential to be provided to the common electrode at an arbitrary point in time during the second period of each horizontal scanning period is a low-level side potential or a high-level side potential;

a third potential selecting unit that selects any of the potentials included in the third potential group in synchronization with a change in the second period potential instruction signal, based on first setting information which can be set externally; and a fourth potential selecting unit that selects any of the potentials included in the fourth potential group in synchronization with a change in the second period potential instruction signal, based on second setting information which can be set externally, wherein during the second period, the common electrode drive circuit provides the potential selected by the third potential selecting unit and the potential selected by the fourth potential selecting unit to the common electrode, based on the second period potential instruction signal.

According to a fifth aspect of the present invention, in the first aspect of the present invention, the common electrode drive circuit includes:

a potential selection signal generating unit that receives a period instruction signal indicating whether an arbitrary point in time during each horizontal scanning period is the first period or the second period, a first period potential instruction signal, and a second period potential instruction signal and outputs the first period potential instruction signal as a potential selection signal when the period instruction signal indicates the first period, and outputs the second period potential instruction signal as the potential selection signal when the period instruction signal indicates the second period, the first period potential instruction signal indicating whether a potential to be provided to the common electrode throughout the first period of each horizontal scanning period is a low-level side potential or a high-level side potential, and the second period potential instruction signal indicating whether a potential to be provided to the common electrode at an arbitrary point in time during the second period of each horizontal scanning period is a low-level side potential or a high-level side potential;

a low-level side potential selecting unit that receives the period instruction signal and selects the first potential when the period instruction signal indicates the first period, and selects the potentials included in the third potential group when the period instruction signal indicates the second period;

a high-level side potential selecting unit that receives the period instruction signal and selects the second potential when the period instruction signal indicates the first period, and selects the potentials included in the fourth potential group when the period instruction signal indicates the second period; and a potential providing unit that provides, based on the potential selection signal, the potential(s) selected by the low-level side potential selecting unit or the potential(s) selected by the high-level side potential selecting unit to the common electrode.

According to a sixth aspect of the present invention, in the fifth aspect of the present invention, the liquid crystal display apparatus further comprises a frequency control unit for externally controlling a frequency of the second period potential instruction signal.

According to a seventh aspect of the present invention, in the fifth aspect of the present invention, the liquid crystal display apparatus further comprises a third potential selecting unit that selects any of the potentials included in the third potential group, based on first setting information which can be set externally; and a fourth potential selecting unit that selects any of the potentials included in the fourth potential group, based on second setting information which can be set externally, wherein during the second period, the common electrode drive circuit provides the potential selected by the third potential selecting unit and the potential selected by the fourth potential selecting unit to the common electrode.

According to an eighth aspect of the present invention, in the fifth aspect of the present invention, the liquid crystal display apparatus further comprises a frequency control unit for externally controlling a frequency of the second period potential instruction signal;

a third potential selecting unit that selects any of the potentials included in the third potential group in synchronization with a change in the second period potential instruction signal, based on first setting information which can be set externally; and a fourth potential selecting unit that selects any of the potentials included in the fourth potential group in synchronization with a change in the second period potential instruction signal, based on second setting information which can be set externally, wherein during the second period, the common electrode drive circuit provides the potential selected by the third potential selecting unit and the potential selected by the fourth potential selecting unit to the common electrode, based on the second period potential instruction signal.

According to a ninth aspect of the present invention, in the first aspect of the present invention, a period during which any of the plurality of scanning signal lines is selected by the scanning signal line drive circuit is the first period, and a period during which none of the plurality of scanning signal lines is selected by the scanning signal line drive circuit is the second period.

A tenth aspect of the present invention is directed to a drive circuit for a liquid crystal display apparatus including a plurality of video signal lines for transmitting video signals representing an image to be displayed; a plurality of scanning signal lines intersecting the plurality of video signal lines; a plurality of pixel electrodes arranged in a matrix form at respective intersection portions of the plurality of video signal lines and the plurality of scanning signal lines; and a common electrode arranged to face the plurality of pixel electrodes, so as to apply a voltage between the plurality of pixel electrodes and the common electrode, the drive circuit comprising:

a video signal line drive circuit that applies the video signals to the plurality of video signal lines;

a scanning signal line drive circuit that selectively drives the plurality of scanning signal lines every horizontal scanning period; and a common electrode drive circuit that drives the common electrode and includes a common electrode potential generating unit that generates a first potential, a second potential, a third potential group, and a fourth potential group, the first potential being a low-level side potential to be provided to the common electrode, the second potential being a high-level side potential to be provided to the common electrode, the third potential group including one or more low-level side potentials having a higher level than the first potential, to be provided to the common electrode, and the fourth potential group including one or more high-level side potentials having a lower level than the second potential, to be provided to the common electrode, wherein the common electrode drive circuit:

alternately provides, during a first period of a horizontal scanning period, the first potential and the second potential to the common electrode every horizontal scanning period, the horizontal scanning period including the first period and a second period; and alternately provides, during the second period, the potentials included in the third potential group and the potentials included in the fourth potential group to the common electrode in each horizontal scanning period.

In addition, variants that are grasped by referring to the embodiment and the drawings in the tenth aspect of the present invention are considered to be means for solving the problems.

A nineteenth aspect of the present invention is directed to a drive method for a liquid crystal display apparatus including a plurality of video signal lines for transmitting video signals representing an image to be displayed; a plurality of scanning signal lines intersecting the plurality of video signal lines; a plurality of pixel electrodes arranged in a matrix form at respective intersection portions of the plurality of video signal lines and the plurality of scanning signal lines; and a common electrode arranged to face the plurality of pixel electrodes, so as to apply a voltage between the plurality of pixel electrodes and the common electrode, the drive method comprising:

a video signal line driving step of applying the video signals to the plurality of video signal lines;

a scanning signal line driving step of selectively driving the plurality of scanning signal lines every horizontal scanning period;

a common electrode potential generating step of generating a first potential, a second potential, a third potential group, and a fourth potential group, the first potential being a low-level side potential to be provided to the common electrode, the second potential being a high-level side potential to be provided to the common electrode, the third potential group including one or more low-level side potentials having a higher level than the first potential, to be provided to the common electrode, and the fourth potential group including one or more high-level side potentials having a lower level than the second potential, to be provided to the common electrode; and a common electrode driving step of driving the common electrode, wherein in the common electrode driving step:

during a first period of a horizontal scanning period, the first potential and the second potential are alternately provided to the common electrode every horizontal scanning period, the horizontal scanning period including the first period and a second period; and during the second period, the potentials included in the third potential group and the potentials included in the fourth potential group are alternately provided to the common electrode in each horizontal scanning period.

In addition, variants that are grasped by referring to the embodiment and the drawings in the nineteenth aspect of the present invention are considered to be means for solving the problems.

Effect of the Invention

According to the first aspect of the present invention, by alternately providing a high-level potential and a low-level potential to the common electrode during the second period of each horizontal scanning period, the drive frequency of the common electrode can be brought out of the human-audible frequency band. In addition, two or more potentials are prepared as the high-level side potential of the common electrode and two or more potentials are prepared as the low-level side potential of the common electrode. A high-level side potential provided to the common electrode during the second period of each horizontal scanning period is set to a level lower than that of a high-level side potential provided to the common electrode during the first period of the horizontal scanning period. In addition, a low-level side potential provided to the common electrode during the second period of each horizontal scanning period is set to a level higher than that of a low-level side potential provided to the common electrode during the first period of the horizontal scanning period. Namely, the amplitude of a signal for driving the common electrode (common electrode signal) is smaller for the second period than for the first period. Hence, an increase in current consumption caused by charging and discharging of a liquid crystal capacitance during the second period is suppressed. By the above, a liquid crystal display apparatus is implemented that is capable of suppressing sound emission caused by alternating driving of liquid crystal while suppressing an increase in power consumption.

According to the second aspect of the present invention, the frequency of a second period potential instruction signal indicating whether a potential to be provided to the common electrode during the second period of a horizontal scanning period is a low-level side potential or a high-level side potential can be changed externally. Hence, by externally adjusting the frequency of the second period potential instruction signal, the frequency of the common electrode signal for the second period can be set to a desired frequency. Accordingly, the frequency of the common electrode signal for the second period can be set according to the drive conditions of the common electrode which vary from device to device, enabling to suppress sound emission in various devices which is caused by alternating driving of liquid crystal. In addition, by minimizing the frequency of the common electrode signal for the second period within a range in which sound emission does not occur, an increase in power consumption is suppressed.

According to the third aspect of the present invention, the high-level side potential and low-level side potential of the common electrode for the second period of a horizontal scanning period can be set externally. Hence, the amplitude of the common electrode signal for the second period of a horizontal scanning period can be set to a desired magnitude. Accordingly, the amplitude of the common electrode signal can be minimized within a range in which sound emission does not occur, enabling to suppress sound emission caused by alternating driving of liquid crystal while effectively suppressing an increase in power consumption.

According to the fourth aspect of the present invention, the frequency and amplitude of the common electrode signal for the second period of a horizontal scanning period can be set according to the device. Hence, sound emission caused by alternating driving of liquid crystal can be suppressed while an increase in power consumption is more effectively suppressed.

According to the fifth aspect of the present invention, in a liquid crystal display apparatus including a common electrode drive circuit including: a low-level side potential selecting unit that selects a low-level side potential to be provided to the common electrode; a high-level side potential selecting unit that selects a high-level side potential to be provided to the common electrode; a potential providing unit that provides the potential selected by the low-level side potential selecting unit or the high-level side potential selecting unit to the common electrode; and a potential selection signal providing unit that provides a potential selection signal indicating whether a potential to be provided to the common electrode is a low-level side potential or a high-level side potential, to the potential providing unit, the same effects as those obtained by the first aspect of the present invention are obtained.

According to the sixth aspect of the present invention, in a liquid crystal display apparatus including a common electrode drive circuit including a low-level side potential selecting unit, a high-level side potential selecting unit, a potential providing unit, and a potential selection signal providing unit, the same effects as those obtained by the second aspect of the present invention are obtained.

According to the seventh aspect of the present invention, in a liquid crystal display apparatus including a common electrode drive circuit including a low-level side potential selecting unit, a high-level side potential selecting unit, a potential providing unit, and a potential selection signal providing unit, the same effects as those obtained by the third aspect of the present invention are obtained.

According to the eighth aspect of the present invention, in a liquid crystal display apparatus including a common electrode drive circuit including a low-level side potential selecting unit, a high-level side potential selecting unit, a potential providing unit, and a potential selection signal providing unit, the same effects as those obtained by the fourth aspect of the present invention are obtained.

According to the ninth aspect of the present invention, in a liquid crystal display apparatus configured to alternately provide a high-level potential and a low-level potential to the common electrode during a horizontal flyback period, the same effects as those obtained by the first aspect of the present invention are obtained.

MODE FOR CARRYING OUT THE INVENTION

Embodiments of the present invention will be described below with reference to the accompanying drawings.

<1. First Embodiment>

<1.1 Overall Configuration and Operation>

Figure 2:
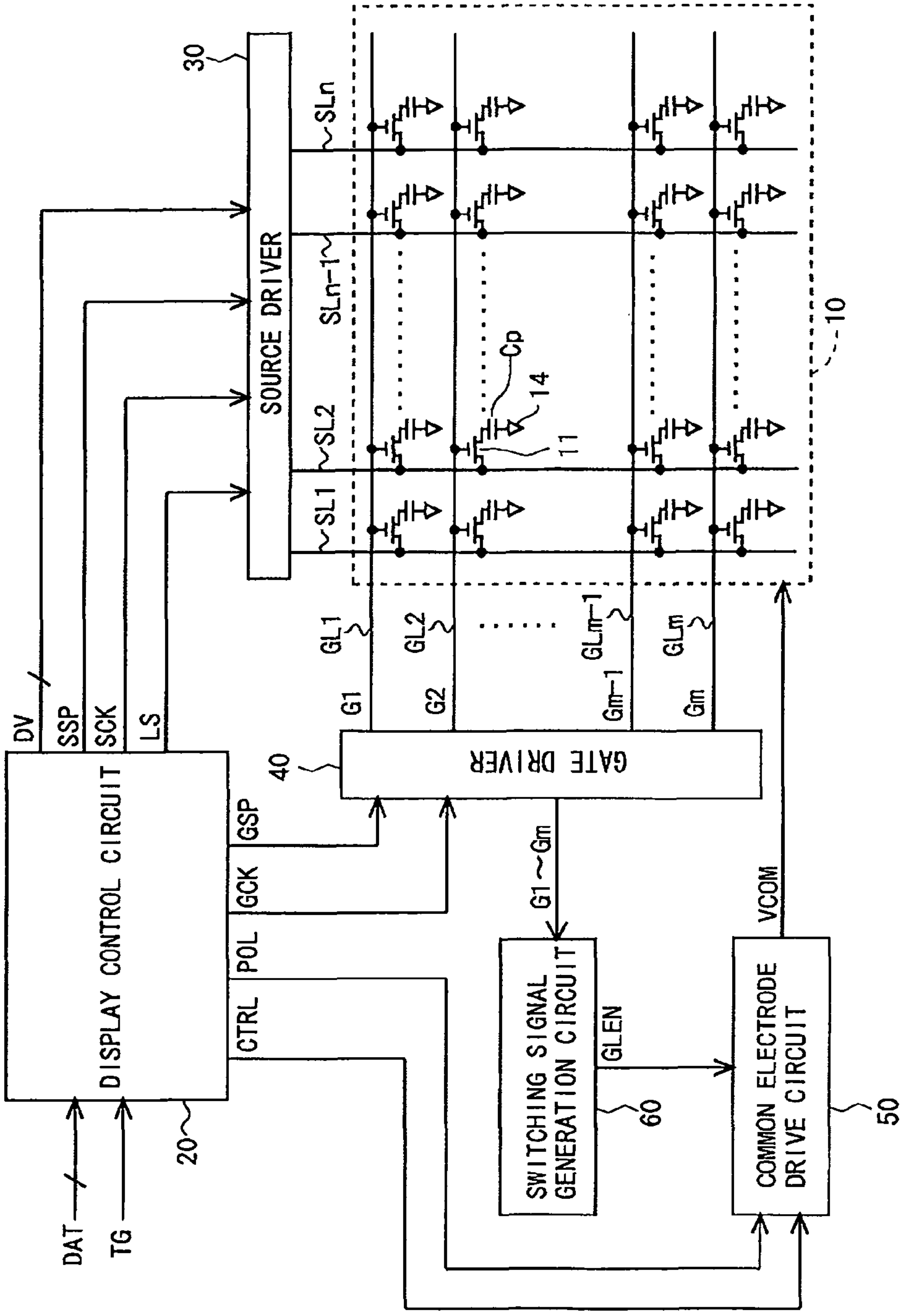
FIG. 2 is a block diagram showing an overall configuration of the liquid crystal display apparatus in the first embodiment.

FIG. 2 is a block diagram showing an overall configuration of a liquid crystal display apparatus according to a first embodiment of the present invention. The liquid crystal display apparatus includes a display unit 10, a display control circuit 20, a source driver (video signal line drive circuit) 30, a gate driver (scanning signal line drive circuit) 40, a common electrode drive circuit 50, and a switching signal generation circuit 60.

The display unit 10 includes a plurality of (n) source bus lines (video signal lines) SL1 to SLn, a plurality of (m) gate bus lines (scanning signal lines) GL1 to GLm, and a plurality of (n×m) pixel formation portions provided at the respective intersections of the plurality of source bus lines SL1 to SLn and the plurality of gate bus lines GL1 to GLm. The pixel formation portions are arranged in a matrix form, thereby forming a pixel array. Each pixel formation portion is composed of a TFT 11 which is a switching element having a gate terminal connected to a gate bus line passing through a corresponding intersection and having a source terminal connected to a source bus line passing through the intersection; a pixel electrode connected to a drain terminal of the TFT 11; a common electrode 14 which is a counter electrode provided to be shared by the plurality of pixel formation portions; and a liquid crystal layer provided to be shared by the plurality of pixel formation portions, and sandwiched between the pixel electrode and the common electrode 14. By a liquid crystal capacitance formed by the pixel electrode and the common electrode 14, a pixel capacitance Cp is formed.

The display control circuit 20 receives an image signal DAT and a timing signal group TG which are sent from an external source, and outputs a digital video signal DV and a source start pulse signal SSP, a source clock signal SCK, a latch strobe signal LS, a gate start pulse signal GSP, a gate clock signal GCK, a polarity instruction signal POL, and a reversal timing control signal CTRL which are used to control the timing of image display on the display unit 10, and so forth. Note that the polarity instruction signal POL is a signal indicating the polarity of a common electrode signal VCOM (a positive or negative polarity with reference to a predetermined potential) for an active period of each horizontal scanning period. Note also that the reversal timing control signal CTRL is a signal indicating the timing at which the polarity of the common electrode signal VCOM is reversed during a non-active period of each horizontal scanning period. In other words, the reversal timing control signal CTRL is a signal indicating the polarity of the common electrode signal VCOM (a positive or negative polarity with reference to the predetermined potential) for the non-active period of each horizontal scanning period. In the present embodiment, a first period potential instruction signal is implemented by the polarity instruction signal POL, and a second period potential instruction signal is implemented by the reversal timing control signal CTRL.

The source driver 30 receives the digital video signal DV, the source start pulse signal SSP, the source clock signal SCK, and the latch strobe signal LS which are outputted from the display control circuit 20, and applies driving video signals to the source bus lines SL1 to SLn, respectively. The gate driver 40 repeats application of active scanning signals G1 to Gm to the gate bus lines GL1 to GLm in cycles of one vertical scanning period, based on the gate start pulse signal GSP and the gate clock signal GCK which are outputted from the display control circuit 20.

Figure 3:
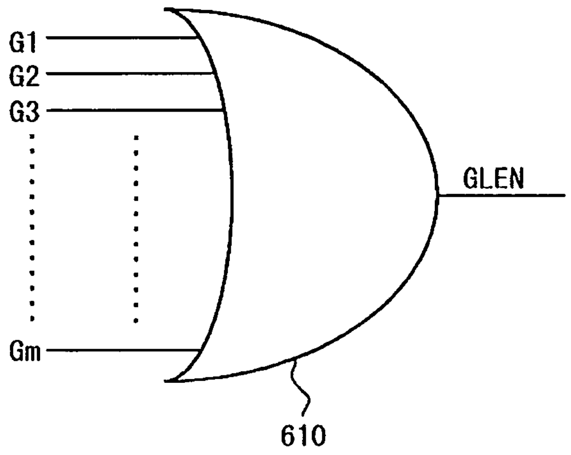
FIG. 3 is a diagram showing an exemplary configuration of a switching signal generation circuit in the first embodiment.

The switching signal generation circuit 60 receives scanning signals G1 to Gm outputted from the gate driver 40 and outputs a switching signal GLEN for switching between an active period and a non-active period. FIG. 3 is a diagram showing an exemplary configuration of the switching signal generation circuit 60. The switching signal generation circuit 60 is implemented by an OR circuit 610 having m input terminals, the number of which is equal to the number of gate bus lines, and one output terminal. Scanning signals G1 to Gm outputted from the gate driver 40 are provided to the m input terminals, respectively. Then, a signal indicating an OR of the scanning signals G1 to Gm is outputted from the output terminal as a switching signal GLEN. By such a configuration, when any of the gate bus lines GL1 to GLm is in a selected state, the switching signal GLEN is at a high level, and when the gate bus lines GL1 to GLm are all in a non-selected state, the switching signal GLEN is at a low level. Note that in the present embodiment, a period instruction signal is implemented by the switching signal GLEN.

The common electrode drive circuit 50 receives the switching signal GLEN outputted from the switching signal generation circuit 60 and the polarity instruction signal POL and the reversal timing control signal CTRL which are outputted from the display control circuit 20, and outputs a common electrode signal VCOM for providing a potential according to those signals to the common electrode 14. Note that a detailed description of the common electrode drive circuit 50 will be provided later.

In the above-described manner, driving video signals are applied to the source bus lines SL1 to SLn, respectively, scanning signals G1 to Gm are applied to the gate bus lines GL1 to GLm, respectively, and a common electrode signal VCOM is applied to the common electrode 14, whereby an image based on an image signal DAT sent from an external source is displayed on the display unit 10.

<1.2 Configuration and Operation of the Common Electrode Drive Circuit>

Figure 4:
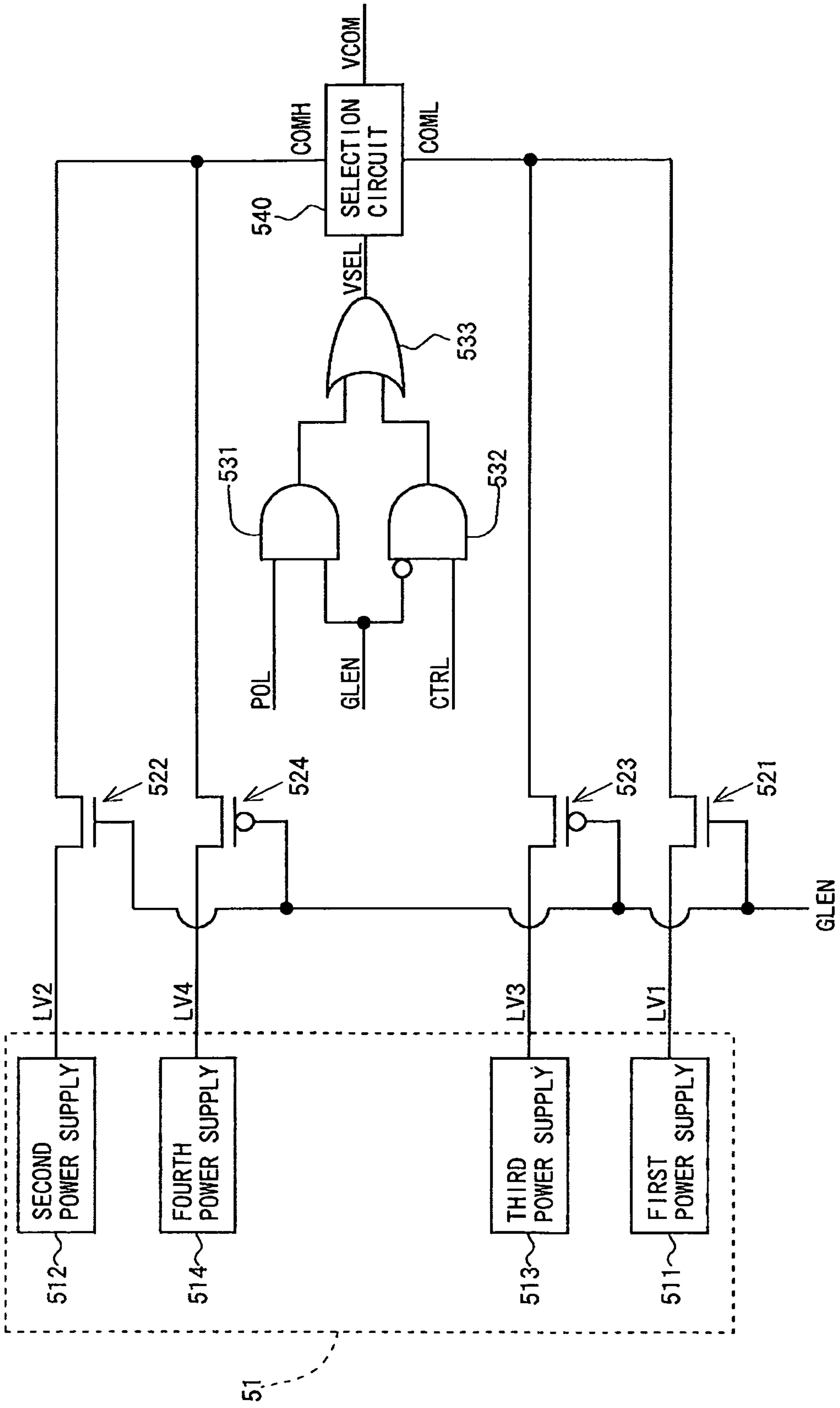
FIG. 4 is a circuit diagram showing a configuration of a common electrode drive circuit in the first embodiment.

FIG. 4 is a circuit diagram showing a configuration of the common electrode drive circuit 50 of the present embodiment. The common electrode drive circuit 50 includes: a common electrode potential generating unit 51 including first to fourth power supplies 511 to 514 that generate four potentials LV1 to LV4, respectively; four MOS transistors 521 to 524; two AND circuits 531 and 532; an OR circuit 533; and a selection circuit 540. In the present embodiment, the MOS transistors 521 and 522 are N-channel MOS transistors, and the MOS transistors 523 and 524 are P-channel MOS transistors. Note that the potential LV1 is a potential having the same level as a low-level side potential of the common electrode 14 in the conventional case, and the potential LV3 is set to a level higher than the potential LV1. Note also that the potential LV2 is a potential having the same level as a high-level side potential of the common electrode 14 in the conventional case, and the potential LV4 is set to a level lower than the potential LV2.

The MOS transistors 521 to 524 each have two conducting terminals and one control terminal. A switching signal GLEN is provided to the control terminals of the MOS transistors 521 to 524. To one conducting terminal of each of the MOS transistors 521 to 524 is provided a corresponding one of the potentials LV1 to LV4. The other conducting terminal of each of the MOS transistors 521 to 524 is connected to the selection circuit 540. Note that, at arbitrary timing, the potential LV1 is provided through the MOS transistor 521 or the potential LV3 is provided through the MOS transistor 523 to the selection circuit 540, as a low-level side potential COML. Likewise, at arbitrary timing, the potential LV2 is provided through the MOS transistor 522 or the potential LV4 is provided through the MOS transistor 524 to the selection circuit 540, as a high-level side potential COMH.

A polarity instruction signal POL is provided to one input terminal of the AND circuit 531, and a switching signal GLEN is provided to the other input terminal. Then, a signal indicating an AND of the polarity instruction signal POL and the switching signal GLEN is outputted from the AND circuit 531. A logic inverted signal of the switching signal GLEN is provided to one input terminal of the AND circuit 532, and a reversal timing control signal CTRL is provided to the other input terminal. Then, a signal indicating an AND of the logic inverted signal of the switching signal GLEN and the reversal timing control signal CTRL is outputted from the AND circuit 532. The output signal from the AND circuit 531 is provided to one input terminal of the OR circuit 533, and the output signal from the AND circuit 532 is provided to the other input terminal. Then, a signal indicating an OR of the output signal from the AND circuit 531 and the output signal from the AND circuit 532 is outputted from the OR circuit 533 as a potential selection signal VSEL.

Figure 5:
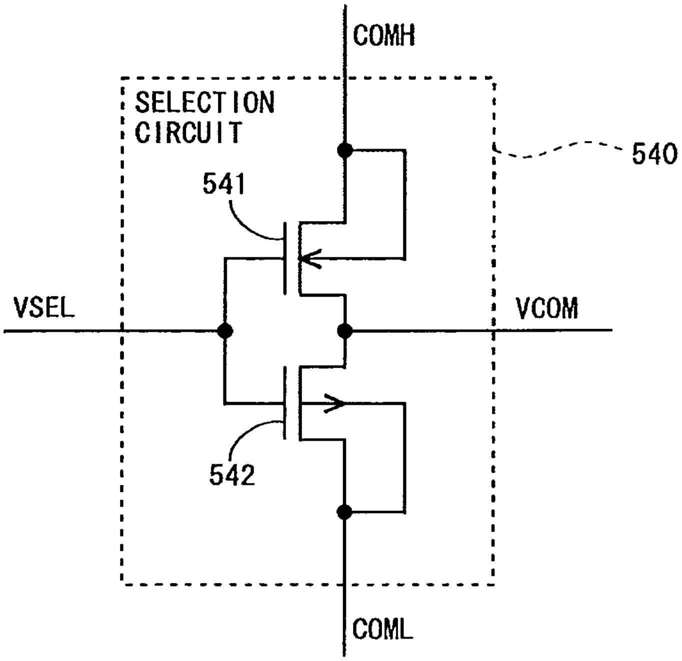
FIG. 5 is a circuit diagram showing an exemplary configuration of a selection circuit in the first embodiment.

The selection circuit 540 receives the low-level side potential COML, the high-level side potential COMH, and the potential selection signal VSEL and provides either one of the low-level side potential COML and the high-level side potential COMH to the common electrode 14 as a common electrode signal VCOM, according to the potential selection signal VSEL. Namely, the potential selected by this selection circuit 540 is provided to the common electrode 14. Now, a specific configuration of the selection circuit 540 will be described. FIG. 5 is a circuit diagram showing an exemplary configuration of the selection circuit 540. The selection circuit 540 is composed of an N-channel MOS transistor 541 and a P-channel MOS transistor 542. The N-channel MOS transistor 541 and the P-channel MOS transistor 542 are connected in series with each other and each have two conducting terminals and one control terminal. A potential selection signal VSEL is provided to the control terminals of the N-channel MOS transistor 541 and the P-channel MOS transistor 542. A high-level side potential COMH is provided to one conducting terminal of the N-channel MOS transistor 541, and a low-level side potential COML is provided to one conducting terminal of the P-channel MOS transistor 542. The other conducting terminal of the N-channel MOS transistor 541 and the other conducting terminal of the P-channel MOS transistor 542 are connected to each other and a potential at the connecting point is provided to the common electrode 14 as a common electrode signal VCOM. In such a configuration, if the potential selection signal VSEL is at a high level, then the N-channel MOS transistor 541 is placed in an on state and the P-channel MOS transistor 542 is placed in an off state, and thus, the high-level side potential COMH is provided to the common electrode 14 as a common electrode signal VCOM. On the other hand, if the potential selection signal VSEL is at a low level, then the N-channel MOS transistor 541 is placed in an off state and the P-channel MOS transistor 542 is placed in an on state, and thus, the low-level side potential COML is provided to the common electrode 14 as a common electrode signal VCOM.

Note that in the present embodiment a low-level side potential selecting unit is implemented by the MOS transistors 521 and 523, a high-level side potential selecting unit is implemented by the MOS transistors 522 and 524, a potential selection signal generating unit is implemented by the AND circuits 531 and 532 and the OR circuit 533, and a potential providing unit is implemented by the selection circuit 540.

<1.3 Method of Driving the Common Electrode>

FIGS. 1A to 1D are timing charts for describing a method of driving the common electrode 14 in the present embodiment. Note that FIGS. 1A to 1D respectively show the waveforms of a switching signal GLEN, a polarity instruction signal POL, a reversal timing control signal CTRL, and a common electrode signal VCOM.

Figures 1A, 1B, 1C, 1D:
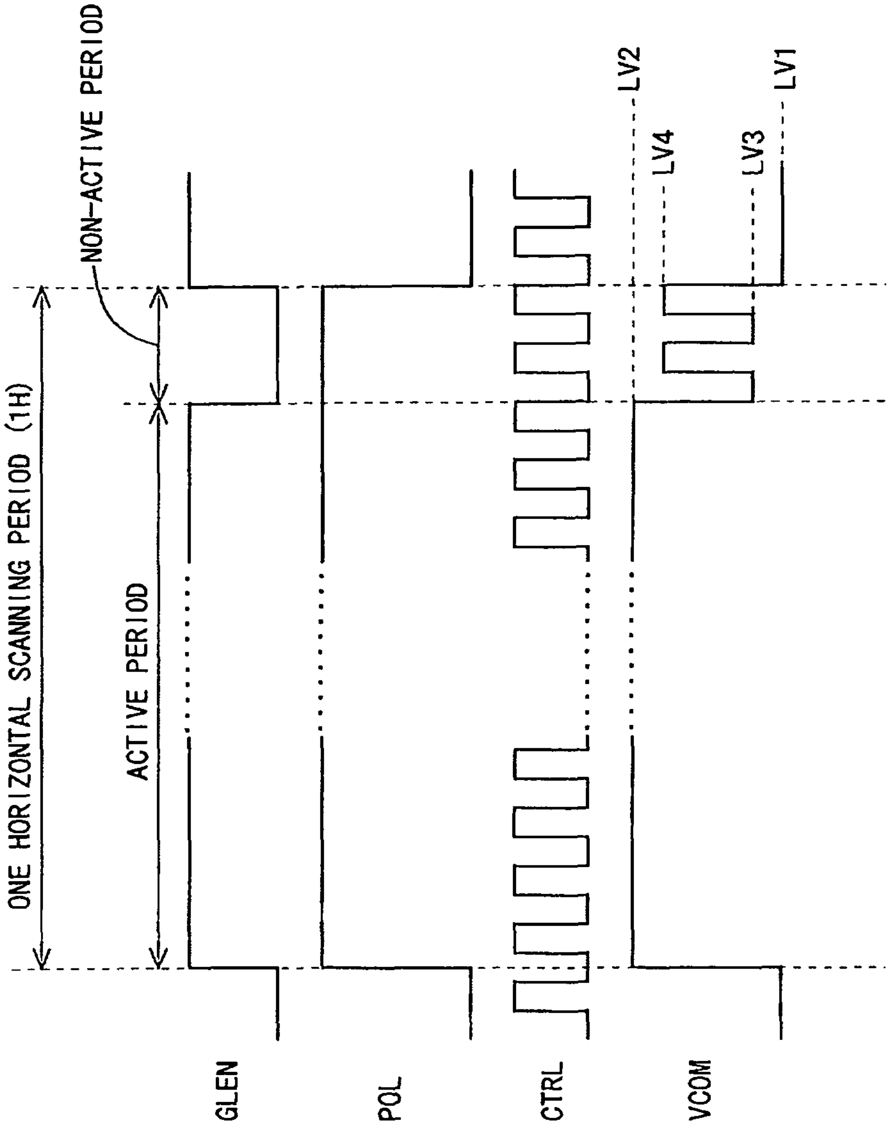
FIGS. 1A to 1D are timing charts for describing a method of driving a common electrode in a liquid crystal display apparatus according to a first embodiment of the present invention.

As described above, when any of the gate bus lines GL1 to GLm is in a selected state, the switching signal GLEN is at a high level, and when the gate bus lines GL1 to GLm are all in a non-selected state, the switching signal GLEN is at a low level. By this, a switching signal GELN having a waveform such as that shown in FIG. 1A is provided to the common electrode drive circuit 50 from the switching signal generation circuit 60. In addition, a polarity instruction signal POL having a waveform such as that shown in FIG. 1B and a reversal timing control signal CTRL having a waveform such as that shown in FIG. 1C are provided to the common electrode drive circuit 50 from the display control circuit 20. With reference to FIGS. 1A to 1D and FIG. 4, how the potential of the common electrode 14 is determined will be described below separately for an active period and a non-active period.

Note that in the present embodiment the active period corresponds to a first period and the non-active period corresponds to a second period.

<1.3.1 For the Active Period>

During the active period, since the switching signal GLEN is at a high level, the MOS transistors 521 and 522 are placed in an on state and thus a potential LV1 is provided to the selection circuit 540 as a low-level side potential COML and a potential LV2 is provided to the selection circuit 540 as a high-level side potential COMH. At this time, if the polarity instruction signal POL is at a high level then an output signal from the AND circuit 531 is at a high level, and if the polarity instruction signal POL is at a low level then the output signal is at a low level. An output signal from the AND circuit 532 is at a low level regardless of the logic level of the reversal timing control signal CTRL. By this, if the polarity instruction signal POL is at a high level then a potential selection signal VSEL outputted from the OR circuit 533 is at a high level, and if the polarity instruction signal POL is at a low level then the potential selection signal VSEL is at a low level. In the selection circuit 540, as described above, if the potential selection signal VSEL is at a high level then the high-level side potential COMH is selected, and if the potential selection signal VSEL is at a low level then the low-level side potential COML is selected. By the above, if the polarity instruction signal POL is at a high level, then the potential of a common electrode signal VCOM is the potential LV2 of the second power supply 512. On the other hand, if the polarity instruction signal POL is at a low level, then the potential of the common electrode signal VCOM is the potential LV1 of the first power supply 511. Therefore, as shown in FIG. 1D, the potential of the common electrode 14 for the active period is either one of LV1 and LV2.

<1.3.2 For the Non-Active Period>

During the non-active period, since the switching signal GLEN is at a low level, the MOS transistors 523 and 524 are placed in an on state and thus a potential LV3 is provided to the selection circuit 540 as a low-level side potential COML and a potential LV4 is provided to the selection circuit 540 as a high-level side potential COMH. At this time, if the reversal timing control signal CTRL is at a high level then an output signal from the AND circuit 532 is at a high level, and if the reversal timing control signal CTRL is at a low level then the output signal is at a low level. An output signal from the AND circuit 531 is at a low level regardless of the logic level of the polarity instruction signal POL. By this, if the reversal timing control signal CTRL is at a high level then a potential selection signal VSEL outputted from the OR circuit 533 is at a high level, and if the reversal timing control signal CTRL is at a low level then the potential selection signal VSEL is at a low level. In the selection circuit 540, as described above, if the potential selection signal VSEL is at a high level then the high-level side potential COMH is selected, and if the potential selection signal VSEL is at a low level then the low-level side potential COML is selected. By the above, if the reversal timing control signal CTRL is at a high level, then the potential of a common electrode signal VCOM is the potential LV4 of the fourth power supply 514. On the other hand, if the reversal timing control signal CTRL is at a low level, then the potential of the common electrode signal VCOM is the potential LV3 of the third power supply 513. Therefore, as shown in FIG. 1D, the potential of the common electrode 14 for the non-active period is either one of LV3 and LV4.

<1.4 Effects>

According to the present embodiment, since a non-active period during which polarity reversal of a common electrode signal VCOM is repeated at predetermined intervals is provided in each horizontal scanning period, the common electrode potential reversal frequency goes out of the human-audible frequency band, thereby suppressing sound emission. In addition, according to the present embodiment, two potentials LV2 and LV4 are prepared as the high-level side potential of the common electrode 14, and two potentials LV1 and LV3 are prepared as the low-level side potential of the common electrode 14. Then, for each of the high-level side and low-level side potentials of the common electrode 14, one of the two potentials is selected during an active period of a horizontal scanning period, and the other one of the two potentials is selected during a non-active period of the horizontal scanning period. Specifically, during the active period, for each of the high-level side potential and the low-level side potential, a potential having the same level as that of the conventional case is selected as a potential to be provided to the common electrode 14. On the other hand, during the non-active period, a selection of a potential to be provided to the common electrode 14 is made such that the difference between a high-level side potential and a low-level side potential is smaller than that for the active period, i.e., such that the amplitude of the common electrode signal VCOM is smaller than that for the active period.

Meanwhile, current consumption I caused by charging and discharging of a liquid crystal capacitance is represented by the following equation (1) when the capacitance value of the liquid crystal capacitance is C, the amplitude of the common electrode signal VCOM is V, and the common electrode potential reversal frequency is F:

$$I=C\times V\times F \quad (1).$$

According to the present embodiment, the amplitude of the common electrode signal VCOM is made smaller for the non-active period than for the active period. Hence, comparing with a conventional configuration in which a potential with the same amplitude as that for the active period is provided to the common electrode 14 during the non-active period, too, the current consumption I caused by charging and discharging of the liquid crystal capacitance is smaller. Namely, power consumption is reduced over the conventional configuration.

As described above, according to the present embodiment, a liquid crystal display apparatus is implemented that is capable of suppressing sound emission caused by alternating driving of liquid crystal while suppressing an increase in power consumption.

<2. Second Embodiment>

<2.1 Configuration>

Figure 6:
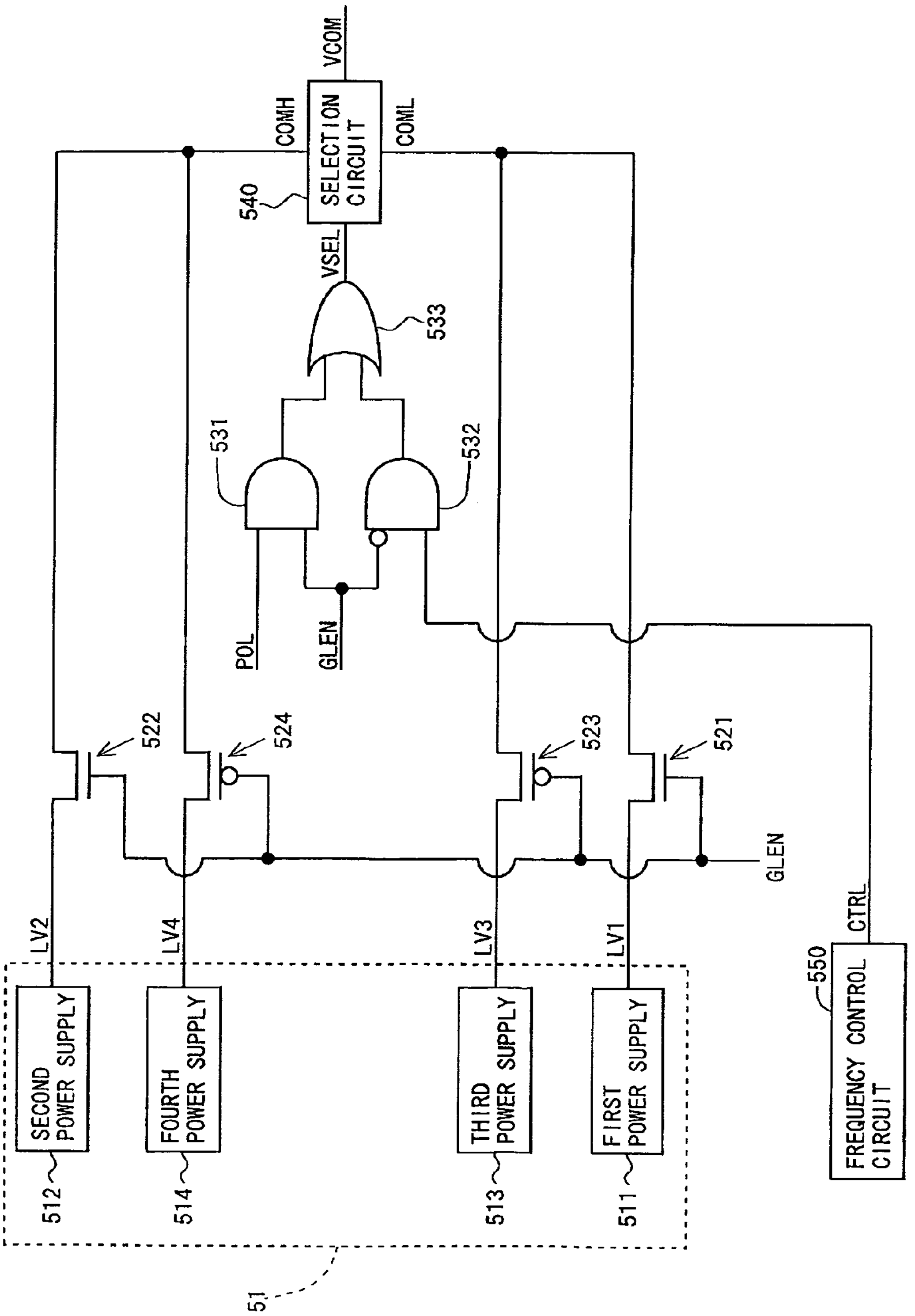
FIG. 6 is a circuit diagram showing a configuration of a common electrode drive circuit of a second embodiment of the present invention.
Figure 7:
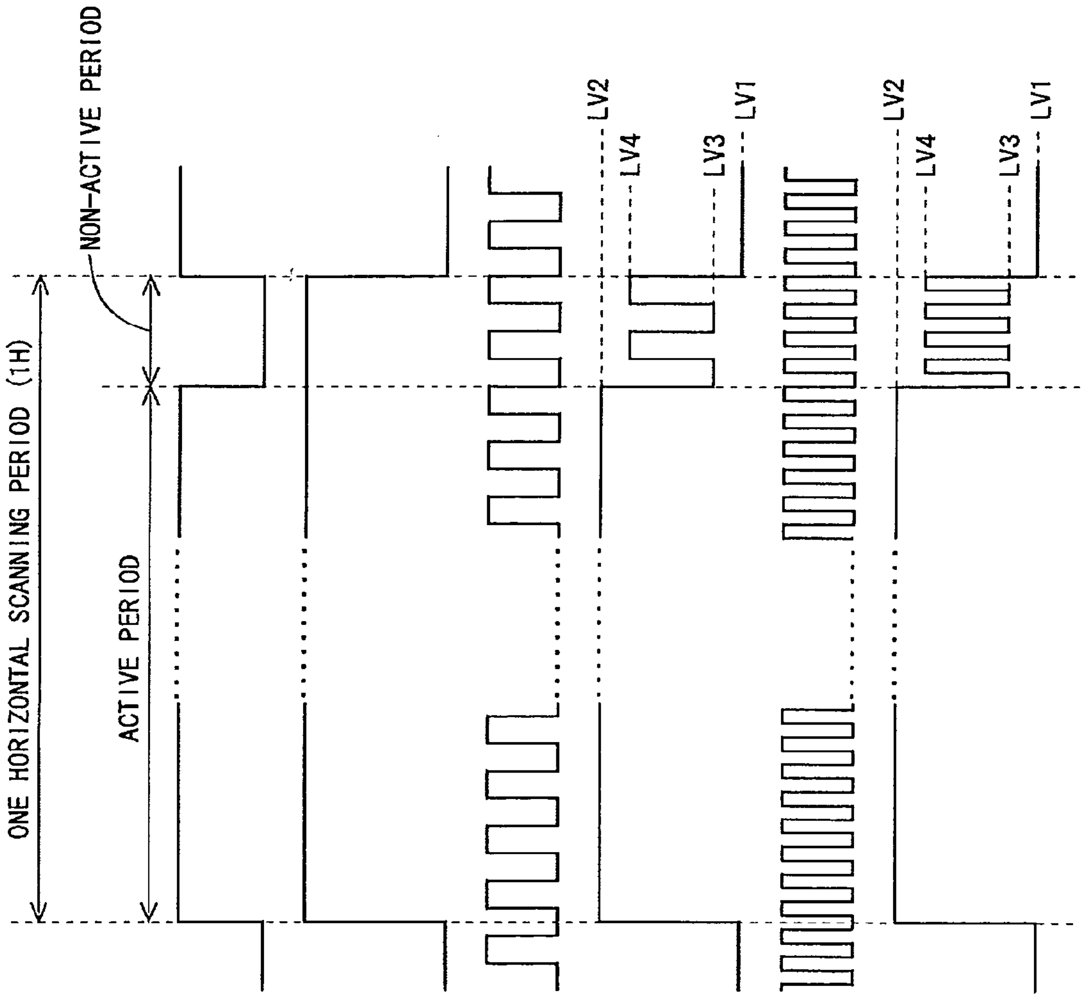
FIGS. 7A to 7F are timing charts for describing a method of driving a common electrode in the second embodiment.

FIG. 6 is a circuit diagram showing a configuration of a common electrode drive circuit 50 of a second embodiment of the present invention. In the present embodiment, the configuration is such that a frequency control circuit 550 is provided so that the frequency of a reversal timing control signal CTRL can be controlled (changed) externally, and a reversal timing control signal CTRL outputted from the frequency control circuit 550 is provided to an input terminal of an AND circuit 532. Other configurations are the same as those in the above-described first embodiment and thus description thereof is omitted. Note that the frequency control circuit 550 may be provided inside the common electrode drive circuit 50 or may be provided outside the common electrode drive circuit 50.

<2.2 Method of Driving a Common Electrode>

FIGS. 7A to 7F are timing charts for describing a method of driving a common electrode 14 in the present embodiment. As with the first embodiment, in the present embodiment, too, during an active period of a horizontal scanning period, if a polarity instruction signal POL is at a high level then the potential of a common electrode signal VCOM is a potential LV2 of a second power supply 512, and if the polarity instruction signal POL is at a low level then the potential of the common electrode signal VCOM is a potential LV1 of a first power supply 511. In addition, during a non-active period of the horizontal scanning period, if a reversal timing control signal CTRL is at a high level then the potential of the common electrode signal VCOM is a potential LV4 of a fourth power supply 514, and if the reversal timing control signal CTRL is at a low level then the potential of the common electrode signal VCOM is a potential LV3 of a third power supply 513.

Meanwhile, in the present embodiment, the provision of the frequency control circuit 550 enables to externally change the frequency of the reversal timing control signal CTRL. Hence, the waveform of the reversal timing control signal CTRL can be, for example, one such as that shown in FIG. 7C or can be one such as that shown in FIG. 7E. By this, the waveform of the common electrode signal VCOM for the non-active period can be one such as that shown in FIG. 7D or can be one such as that shown in FIG. 7F. As such, in the present embodiment, the frequency of the common electrode signal VCOM for the non-active period of the horizontal scanning period can be externally set to any frequency.

<2.3 Effects>

According to the present embodiment, the frequency of a reversal timing control signal CTRL indicating the timing of polarity reversal of a common electrode signal VCOM for a non-active period of a horizontal scanning period can be changed externally. Hence, by externally adjusting the frequency of the reversal timing control signal CTRL, the frequency of the common electrode signal VCOM for the non-active period of the horizontal scanning period can be set to a desired frequency. Meanwhile, the frequency of the common electrode signal VCOM varies from device to device, and how sound emission (noise) occurs also varies depending on the drive conditions of the common electrode 14. Regarding this point, according to the present embodiment, since the frequency of the common electrode signal VCOM for the non-active period of the horizontal scanning period can be set to a desired frequency, the occurrence of sound emission caused by alternating driving of liquid crystal can be suppressed in various devices. In addition, by minimizing the frequency of the common electrode signal VCOM within a range in which sound emission does not occur, an increase in power consumption can be suppressed.

<3. Third Embodiment>

<3.1 Configuration>

Figure 8:
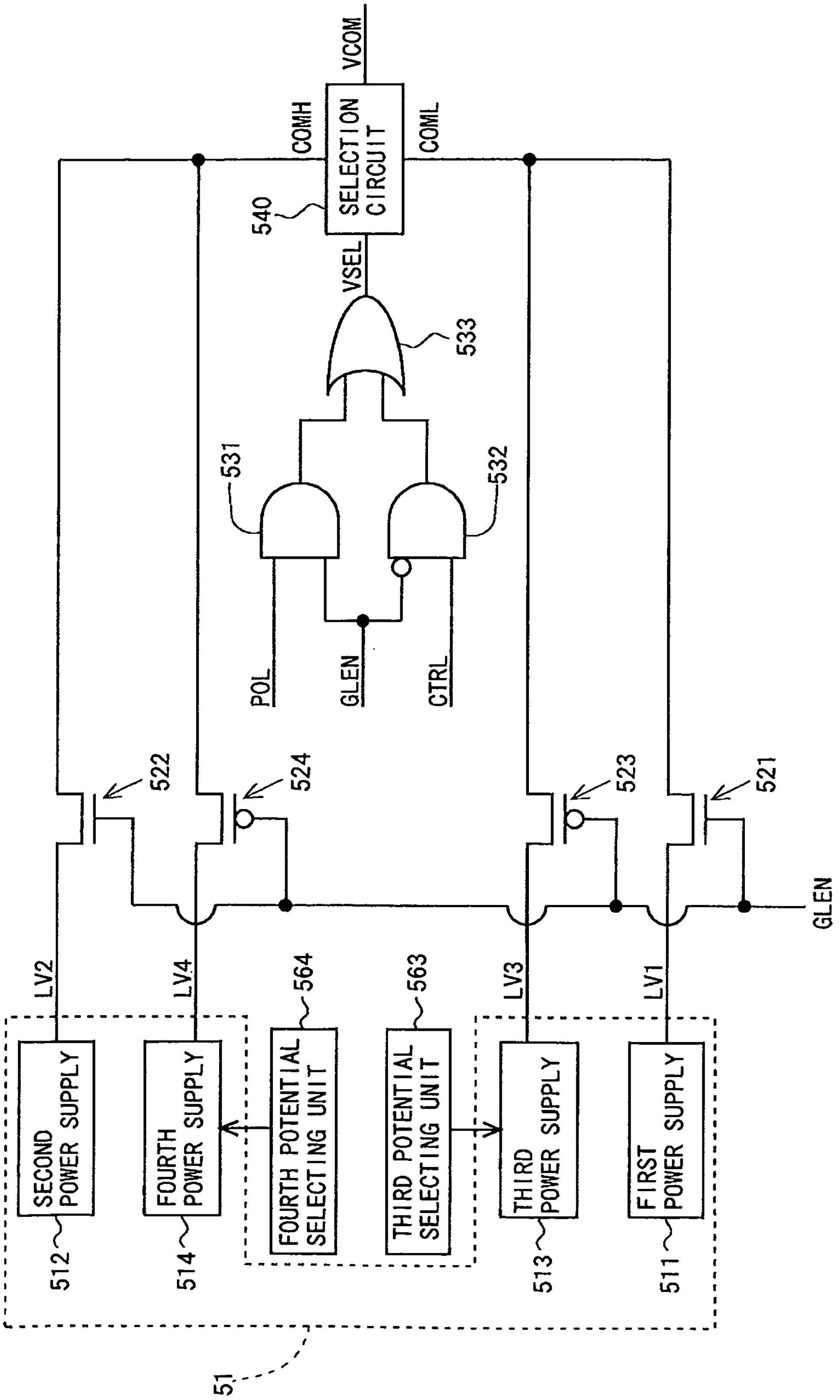
FIG. 8 is a circuit diagram showing a configuration of a common electrode drive circuit of a third embodiment of the present invention.

FIG. 8 is a circuit diagram showing a configuration of a common electrode drive circuit 50 of a third embodiment of the present invention. In the present embodiment, there are provided a fourth potential selecting unit 564 for selecting a potential LV4 generated by a fourth power supply 514 from among arbitrary levels in a predetermined range; and a third potential selecting unit 563 for selecting a potential LV3 generated by a third power supply 513 from among arbitrary levels in a predetermined range. The fourth potential selecting unit 564 includes a register which can be set externally. The fourth potential selecting unit 564 makes a selection of the level of the potential LV4 based on data (second setting information) stored in the register. Likewise, the third potential selecting unit 563 also includes a register which can be set externally. The third potential selecting unit 563 makes a selection of the level of the potential LV3 based on data (first setting information) stored in the register. Other configurations are the same as those in the first embodiment and thus description thereof is omitted.

<3.2 Method of Driving a Common Electrode>

FIGS. 9A to 9E are timing charts for describing a method of driving a common electrode 14 in the present embodiment. As with the first embodiment, in the present embodiment, too, during an active period of a horizontal scanning period, if a polarity instruction signal POL is at a high level then the potential of a common electrode signal VCOM is a potential LV2 of a second power supply 512, and if the polarity instruction signal POL is at a low level then the potential of the common electrode signal VCOM is a potential LV1 of a first power supply 511. In addition, during a non-active period of the horizontal scanning period, if a reversal timing control signal CTRL is at a high level then the potential of the common electrode signal VCOM is the potential LV4 of the fourth power supply 514, and if the reversal timing control signal CTRL is at a low level then the potential of the common electrode signal VCOM is the potential LV3 of the third power supply 513.

Figures 9A, 9B, 9C, 9D, 9E:
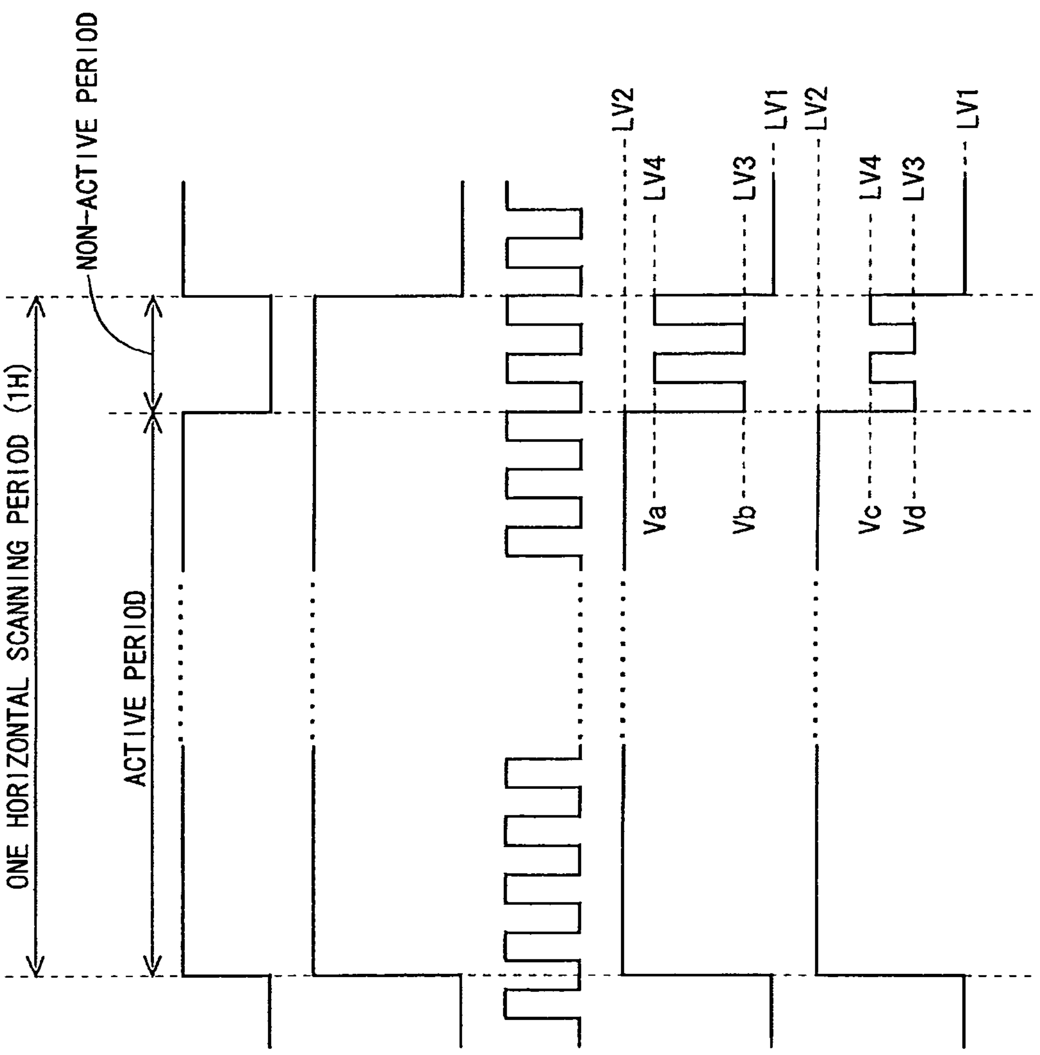
FIGS. 9A to 9E are timing charts for describing a method of driving a common electrode in the third embodiment.

Meanwhile, in the present embodiment, the provision of the fourth potential selecting unit 564 enables to externally change the level of a potential LV4 generated by the fourth power supply 514. Likewise, the provision of the third potential selecting unit 563 enables to externally change the level of a potential LV3 generated by the third power supply 513. By this, the potential of the common electrode signal VCOM for the non-active period of the horizontal scanning period can be changed, for example, between Va and Vb as shown in FIG. 9D or can be changed between Vc and Vd as shown in FIG. 9E ($Va>Vc$, $Vb<Vd$). As such, in the present embodiment, the high-level side and low-level side potentials of the common electrode signal VCOM for the non-active period of the horizontal scanning period can be set externally.

<3.3 Effects>

According to the present embodiment, the high-level side and low-level side potentials of a common electrode signal VCOM for a non-active period of a horizontal scanning period can be set externally. Hence, the amplitude of the common electrode signal VCOM for the non-active period of the horizontal scanning period can be set to a desired magnitude. Meanwhile, as shown in the above equation (1), the current consumption I caused by charging and discharging of a liquid crystal capacitance is proportional to the amplitude of the common electrode signal VCOM. Regarding this point, according to the present embodiment, since the amplitude of the common electrode signal VCOM for the non-active period of the horizontal scanning period can be set to a desired magnitude, the amplitude of the common electrode signal VCOM can be minimized within a range in which sound emission does not occur. By this, sound emission caused by alternating driving of liquid crystal can be suppressed while an increase in power consumption is effectively suppressed.

4. Fourth Embodiment

<4.1 Configuration>

Figure 10:
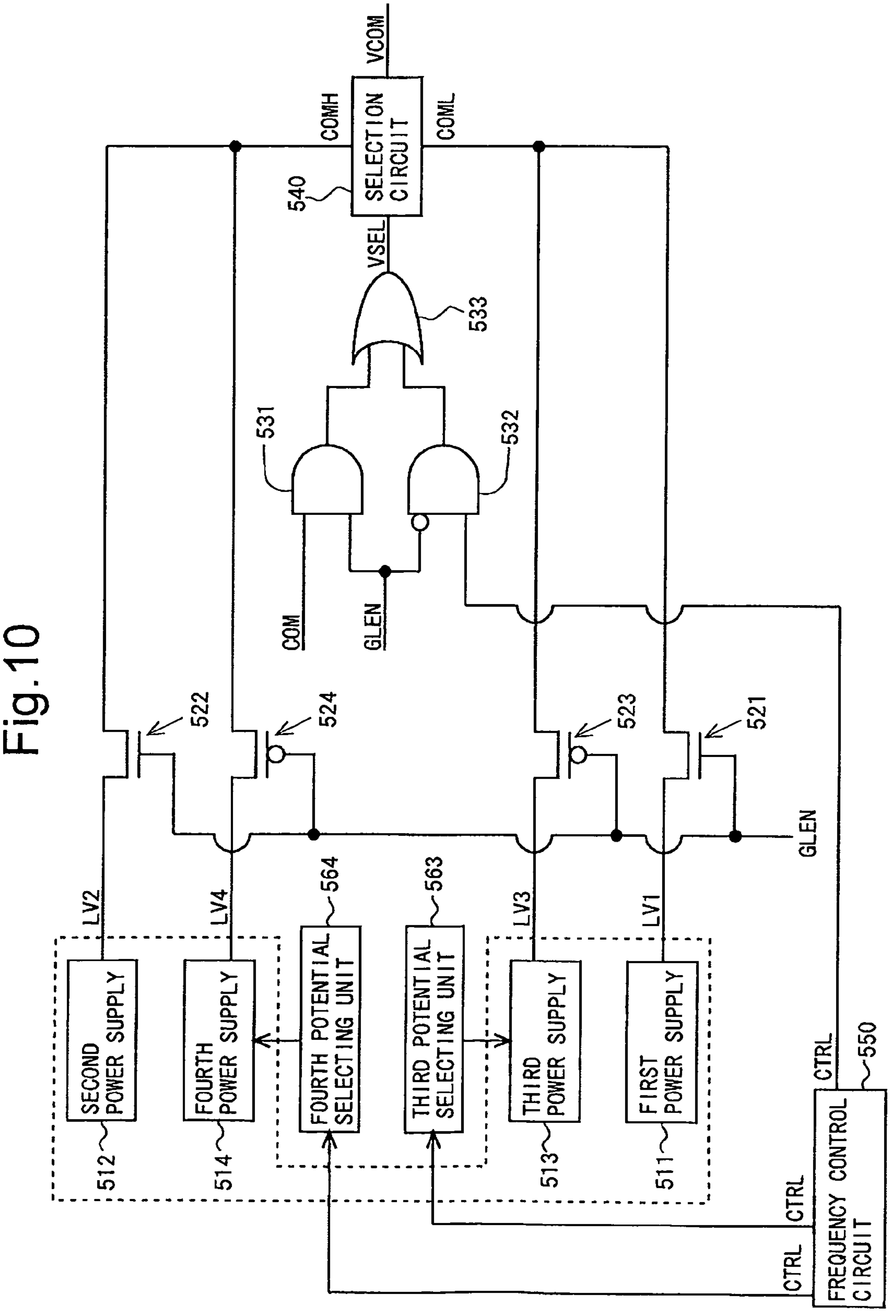
FIG. 10 is a circuit diagram showing a configuration of a common electrode drive circuit of a fourth embodiment of the present invention.

FIG. 10 is a circuit diagram showing a configuration of a common electrode drive circuit 50 of a fourth embodiment of the present invention. As with the second embodiment, a frequency control circuit 550 is provided so that the frequency of a reversal timing control signal CTRL can be changed externally. In addition, as with the third embodiment, there are provided a fourth potential selecting unit 564 for selecting a potential LV4 generated by a fourth power supply 514 from among arbitrary levels in a predetermined range; and a third potential selecting unit 563 for selecting a potential LV3 generated by a third power supply 513 from among arbitrary levels in a predetermined range. Furthermore, in the present embodiment, the configuration is such that a reversal timing control signal CTRL outputted from the frequency control circuit 550 is provided to the fourth potential selecting unit 564 and the third potential selecting unit 563. Then, the fourth potential selecting unit 564 and the third potential selecting unit 563 make a potential level selection in synchronization with a change in the potential of the reversal timing control signal CTRL. Other configurations are the same as those in the first embodiment and thus description thereof is omitted.

<4.2 Method of Driving a Common Electrode>

FIGS. 11A to 11D are timing charts for describing a method of driving a common electrode 14 in the present embodiment. As with the first to third embodiments, in the present embodiment, too, during an active period of a horizontal scanning period, if a polarity instruction signal POL is at a high level then the potential of a common electrode signal VCOM is a potential LV2 of a second power supply 512, and if the polarity instruction signal POL is at a low level then the potential of the common electrode signal VCOM is a potential LV1 of a first power supply 511. In addition, during a non-active period of the horizontal scanning period, if a reversal timing control signal CTRL is at a high level then the potential of the common electrode signal VCOM is the potential LV4 of the fourth power supply 514, and if the reversal timing control signal CTRL is at a low level then the potential of the common electrode signal VCOM is the potential LV3 of the third power supply 513.

Figures 11A, 11B, 11C, 11D:
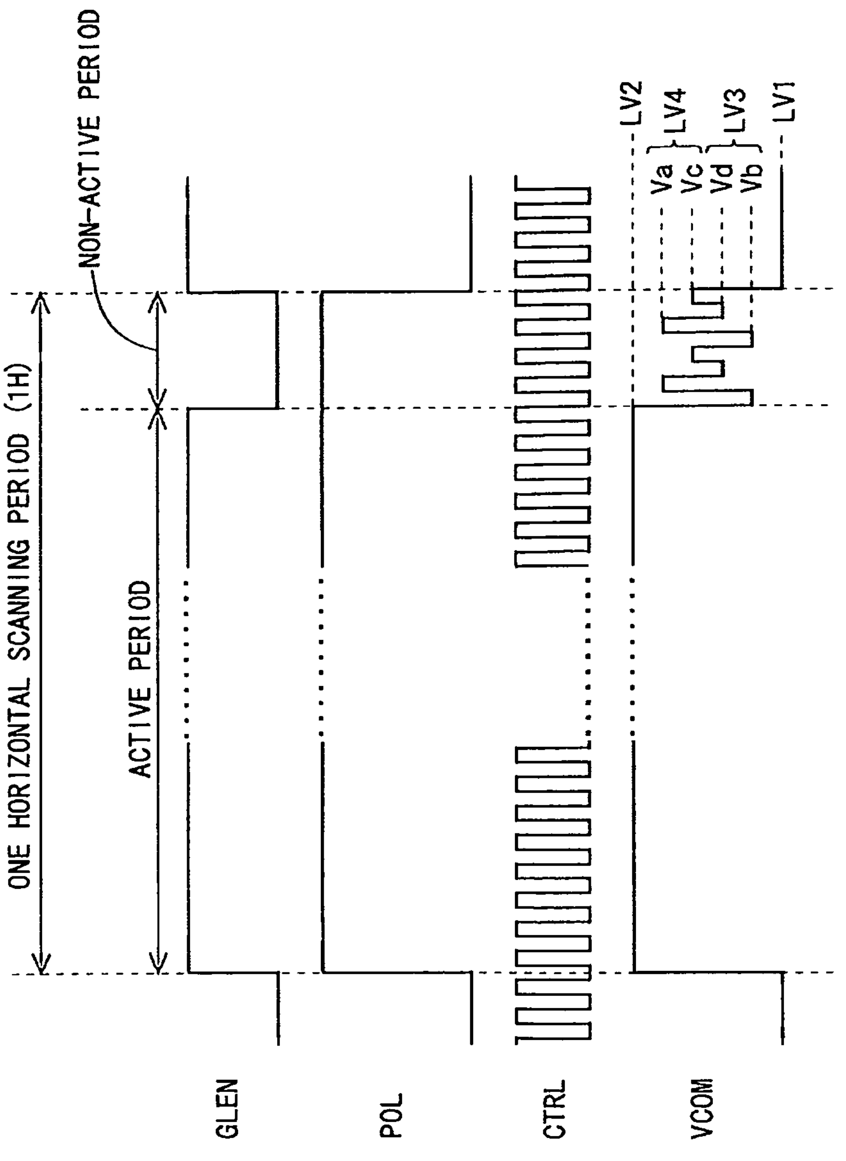
FIGS. 11A to 11D are timing charts for describing a method of driving a common electrode in the fourth embodiment.
Figure 12:
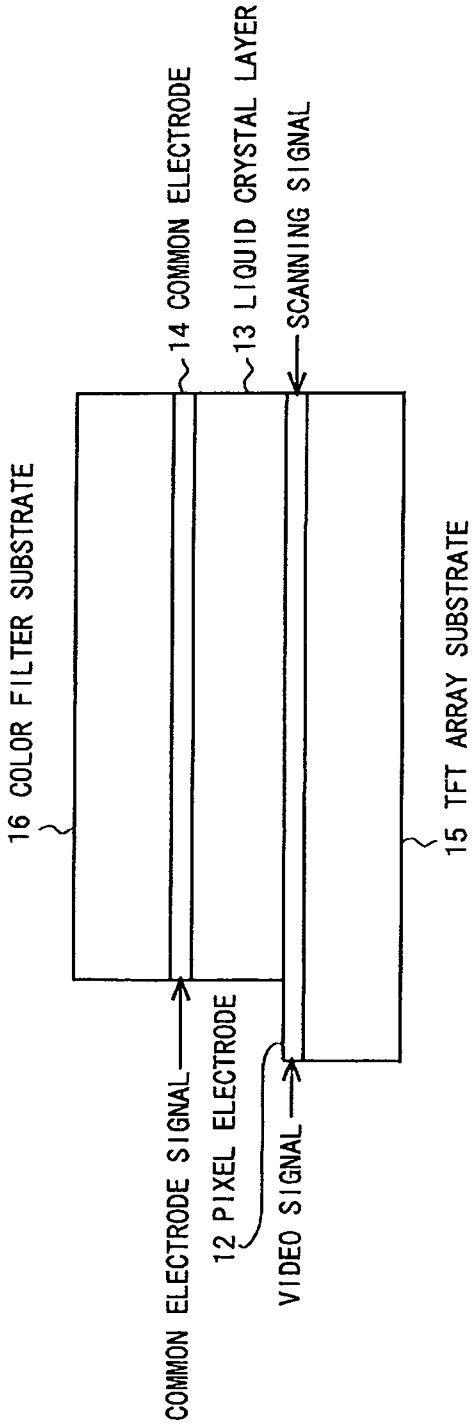
FIG. 12 is a diagram schematically showing a cross section of a liquid crystal panel of an active matrix-type liquid crystal display apparatus.
Figure 13:
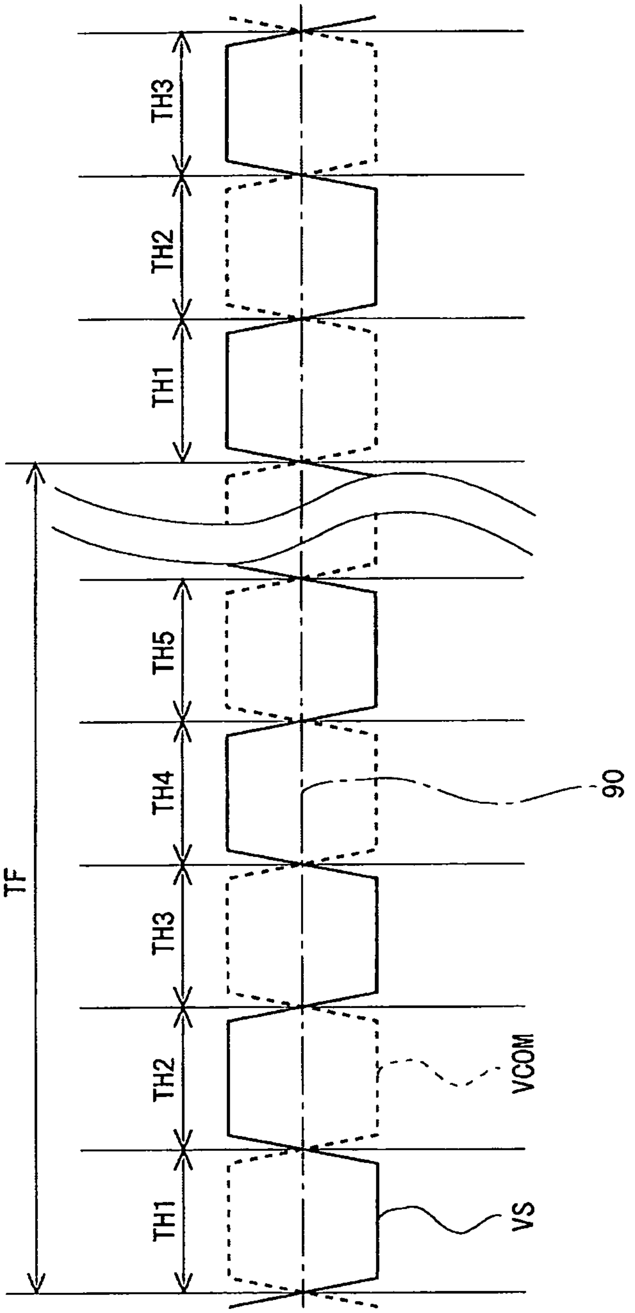
FIG. 13 is a signal waveform diagram for a liquid crystal display apparatus which adopts line reversal driving as its driving scheme in a conventional example.
Figure 14:
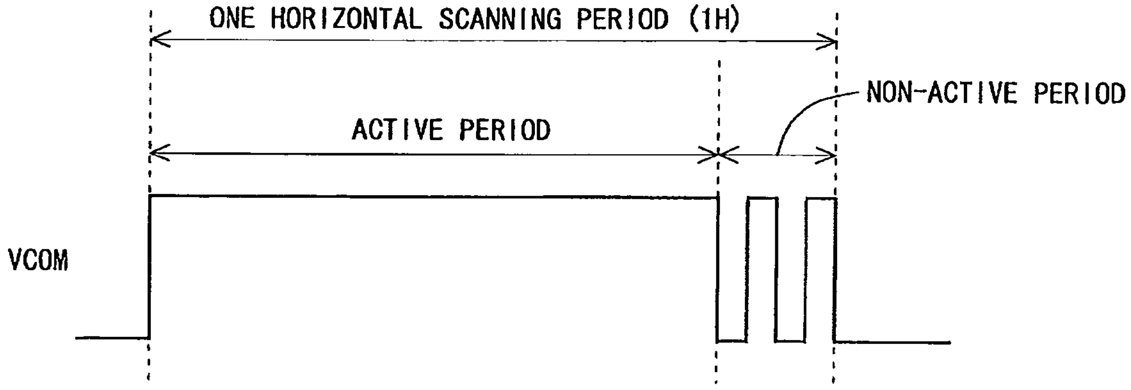
FIG. 14 is a signal waveform diagram for an electronic device disclosed in Japanese Patent Application Laid-Open No. 2008-40195.

Meanwhile, in the present embodiment, the provision of the fourth potential selecting unit 564 and the third potential selecting unit 563 enables to externally change the level of a potential LV4 generated by the fourth power supply 514 and the level of a potential LV3 generated by the third power supply 513. In addition, the frequency control circuit 550 is provided and is configured to provide a reversal timing control signal CTRL outputted therefrom, to the fourth potential selecting unit 564 and the third potential selecting unit 563. Then, the fourth potential selecting unit 564 and the third potential selecting unit 563 make a potential level selection in synchronization with the reversal timing control signal CTRL. Hence, the potential of the common electrode signal VCOM for the non-active period of the horizontal scanning period can be changed, for example, between four different levels as shown in FIG. 11D.

<4.3 Effects>

According to the present embodiment, the level of a potential LV4 generated by the fourth power supply 514 and the level of a potential LV3 generated by the third power supply 513 can be changed in synchronization with a change in the potential of a reversal timing control signal CTRL outputted from the frequency control circuit 550. In addition, by externally adjusting the frequency of the reversal timing control signal CTRL, the frequency of a common electrode signal VCOM for a non-active period of a horizontal scanning period can be set to a desired frequency. By this, the frequency and amplitude of the common electrode signal VCOM for the non-active period of the horizontal scanning period can be set according to the device. As a result, sound emission caused by alternating driving of liquid crystal can be suppressed while an increase in power consumption is more effectively suppressed.

<5. Others>

Although the above-described embodiments employ a configuration in which a non-active period is provided immediately before the end of each horizontal scanning period, the present invention is not limited thereto and the configuration may be such that a non-active period is provided immediately after the start of each horizontal scanning period. Alternatively, in one frame period, for a given horizontal scanning period, a non-active period may be provided immediately before the end of the horizontal scanning period, and for another given horizontal scanning period, a non-active period may be provided immediately after the start of the horizontal scanning period.

DESCRIPTION OF REFERENCE CHARACTERS

11: TFT
14: COMMON ELECTRODE
20: DISPLAY CONTROL CIRCUIT
30: SOURCE DRIVER (VIDEO SIGNAL LINE DRIVE CIRCUIT)
40: GATE DRIVER (SCANNING SIGNAL LINE DRIVE CIRCUIT)
50: COMMON ELECTRODE DRIVE CIRCUIT
51: COMMON ELECTRODE POTENTIAL GENERATING UNIT
60: SWITCHING SIGNAL GENERATION CIRCUIT
511 to 514: FIRST TO FOURTH POWER SUPPLIES
521 to 524: MOS TRANSISTOR
531 and 532: AND CIRCUIT
533: OR CIRCUIT
540: SELECTION CIRCUIT
550: FREQUENCY CONTROL CIRCUIT
563: THIRD POTENTIAL SELECTING UNIT
564: FOURTH POTENTIAL SELECTING UNIT
CTRL: REVERSAL TIMING CONTROL SIGNAL
GLEN: SWITCHING SIGNAL
POL: POLARITY INSTRUCTION SIGNAL
VCOM: COMMON ELECTRODE SIGNAL

The invention claimed is:

1. A liquid crystal display apparatus comprising:

a plurality of video signal lines for transmitting video signals representing an image to be displayed;

a plurality of scanning signal lines intersecting the plurality of video signal lines;

a video signal line drive circuit that applies the video signals to the plurality of video signal lines;

a scanning signal line drive circuit that selectively drives the plurality of scanning signal lines every horizontal scanning period;

a plurality of pixel electrodes arranged in a matrix form at respective intersection portions of the plurality of video signal lines and the plurality of scanning signal lines;

a common electrode arranged to face the plurality of pixel electrodes, so as to apply a voltage between the plurality of pixel electrodes and the common electrode;

a common electrode drive circuit that drives the common electrode and includes a common electrode potential generating unit that generates a first potential, a second potential, a third potential group, and a fourth potential group, the first potential being a low-level side potential to be provided to the common electrode, the second potential being a high-level side potential to be provided to the common electrode, the third potential group including one or more low-level side potentials having a higher level than the first potential, to be provided to the common electrode, and the fourth potential group including one or more high-level side potentials having a lower level than the second potential, to be provided to the common electrode, wherein the common electrode drive circuit, alternately provides, during a first period of a horizontal scanning period, the first potential and the second potential to the common electrode every horizontal scanning period, the horizontal scanning period including the first period and a second period, and alternately provides, during the second period, the potentials included in the third potential group and the potentials included in the fourth potential group to the common electrode in each horizontal scanning period;

a third potential selecting unit that selects any of the potentials included in the third potential group, based on first setting information which can be set externally; and a fourth potential selecting unit that selects any of the potentials included in the fourth potential group, based on second setting information which can be set externally, wherein during the second period, the common electrode drive circuit provides the potential selected by the third potential selecting unit and the potential selected by the fourth potential selecting unit to the common electrode.

2. The liquid crystal display apparatus according to claim 1, further comprising:

a frequency control unit for externally controlling a frequency of a second period potential instruction signal.

3. The liquid crystal display apparatus according to claim 1, further comprising:

a frequency control unit for externally controlling a frequency of a second period potential instruction signal, wherein the third potential selecting unit is configured to select any of the potentials included in the third potential group in synchronization with a change in the second period potential instruction signal, the fourth potential selecting unit is configured to select any of the potentials included in the fourth potential group in synchronization with a change in the second period potential instruction signal, and during the second period, the common electrode drive circuit provides the potential selected by the third potential selecting unit and the potential selected by the fourth potential selecting unit to the common electrode, based on the second period potential instruction signal.

4. A liquid crystal display apparatus comprising:

a plurality of video signal lines for transmitting video signals representing an image to be displayed;

a plurality of scanning signal lines intersecting the plurality of video signal lines;

a video signal line drive circuit that applies the video signals to the plurality of video signal lines;

a scanning signal line drive circuit that selectively drives the plurality of scanning signal lines every horizontal scanning period;

a plurality of pixel electrodes arranged in a matrix form at respective intersection portions of the plurality of video signal lines and the plurality of scanning signal lines;

a common electrode arranged to face the plurality of pixel electrodes, so as to apply a voltage between the plurality of pixel electrodes and the common electrode;

a common electrode drive circuit that drives the common electrode and includes a common electrode potential generating unit that generates a first potential, a second potential, a third potential group, and a fourth potential group, the first potential being a low-level side potential to be provided to the common electrode, the second potential being a high-level side potential to be provided to the common electrode, the third potential group including one or more low-level side potentials having a higher level than the first potential, to be provided to the common electrode, and the fourth potential group including one or more high-level side potentials having a lower level than the second potential, to be provided to the common electrode, wherein the common electrode drive circuit, alternately provides, during a first period of a horizontal scanning period, the first potential and the second potential to the common electrode every horizontal scanning period, the horizontal scanning period including the first period and a second period, and alternately provides, during the second period, the potentials included in the third potential group and the potentials included in the fourth potential group to the common electrode in each horizontal scanning period;

a frequency control unit for externally controlling a frequency of a second period potential instruction signal indicating whether a potential to be provided to the common electrode at an arbitrary point in time during the second period of each horizontal scanning period is a low-level side potential or a high-level side potential;

a third potential selecting unit that selects any of the potentials included in the third potential group in synchronization with a change in the second period potential instruction signal, based on first setting information which can be set externally; and a fourth potential selecting unit that selects any of the potentials included in the fourth potential group in synchronization with a change in the second period potential instruction signal, based on second setting information which can be set externally, wherein during the second period, the common electrode drive circuit provides the potential selected by the third potential selecting unit and the potential selected by the fourth potential selecting unit to the common electrode, based on the second period potential instruction signal.

5. A liquid crystal display apparatus comprising:

a plurality of video signal lines for transmitting video signals representing an image to be displayed;

a plurality of scanning signal lines intersecting the plurality of video signal lines;

a video signal line drive circuit that a lies the video signals to the plurality of video signal lines;

a scanning signal line drive circuit that selectively drives the plurality of scanning signal lines every horizontal scanning period;

a plurality of pixel electrodes arranged in a matrix form at respective intersection portions of the plurality of video signal lines and the plurality of scanning signal lines;

a common electrode arranged to face the plurality of pixel electrodes, so as to apply a voltage between the plurality of pixel electrodes and the common electrode;

a common electrode drive circuit that drives the common electrode and includes a common electrode potential generating unit that generates a first potential, a second potential, a third potential group, and a fourth potential group, the first potential being a low-level side potential to be provided to the common electrode, the second potential being a high-level side potential to be provided to the common electrode, the third potential group including one or more low-level side potentials having a higher level than the first potential, to be provided to the common electrode, and the fourth potential group including one or more high-level side potentials having a lower level than the second potential, to be provided to the common electrode, wherein the common electrode drive circuit, alternately provides, during a first period of a horizontal scanning period, the first potential and the second potential to the common electrode every horizontal scanning period, the horizontal scanning period including the first period and a second period, and alternately provides, during the second period, the potentials included in the third potential group and the potentials included in the fourth potential group to the common electrode in each horizontal scanning period, and the common electrode drive circuit includes, a potential selection signal generating unit that receives a period instruction signal indicating whether an arbitrary point in time during each horizontal scanning period is the first period or the second period, a first period potential instruction signal, and a second period potential instruction signal and outputs the first period potential instruction signal as a potential selection signal when the period instruction signal indicates the first period, and outputs the second period potential instruction signal as the potential selection signal when the period instruction signal indicates the second period, the first period potential instruction signal indicating whether a potential to be provided to the common electrode throughout the first period of each horizontal scanning period is a low-level side potential or a high-level side potential, and the second period potential instruction signal indicating whether a potential to be provided to the common electrode at an arbitrary point in time during the second period of each horizontal scanning period is a low-level side potential or a high-level side potential, a low-level side potential selecting unit that receives the period instruction signal and selects the first potential when the period instruction signal indicates the first period, and selects the potentials included in the third potential group when the period instruction signal indicates the second period, a high-level side potential selecting unit that receives the period instruction signal and selects the second potential when the period instruction signal indicates the first period, and selects the potentials included in the fourth potential group when the period instruction signal indicates the second period, and a potential providing unit that provides, based on the potential selection signal, the potential(s) selected by the low-level side potential selecting unit or the potential(s) selected by the high-level side potential selecting unit to the common electrode.

6. The liquid crystal display apparatus according to claim 5, further comprising:

a third potential selecting unit that selects any of the potentials included in the third potential group, based on first setting information which can be set externally; and a fourth potential selecting unit that selects any of the potentials included in the fourth potential group, based on second setting information which can be set externally, wherein during the second period, the common electrode drive circuit provides the potential selected by the third potential selecting unit and the potential selected by the fourth potential selecting unit to the common electrode.

* * * * *